(12) United States Patent
Gillessen et al.

(10) Patent No.: US 11,285,506 B2
(45) Date of Patent: Mar. 29, 2022

(54) DEVICE FOR LACQUER TRANSFER

(71) Applicants: Airbus Operations GmbH, Hamburg (DE); Airbus (SAS), Blagnac (FR)

(72) Inventors: Alexander Gillessen, Stade (DE); Pierre Zahlen, Stade (DE); Christian Schepp, Hamburg (DE); Daniel Kress, Hamburg (DE); Waldemar Kümmel, Hamburg (DE)

(73) Assignees: AIRBUS OPERATIONS GmbH, Hamburg (DE); AIRBUS (SAS), Blagnac (FR)

( * ) Notice: Subject to any disclaimer, the term of this patent is extended or adjusted under 35 U.S.C. 154(b) by 8 days.

(21) Appl. No.: 16/861,642

(22) Filed: Apr. 29, 2020

(65) Prior Publication Data

US 2020/0346242 A1 Nov. 5, 2020

(30) Foreign Application Priority Data

Apr. 30, 2019 (DE) .......................... 102019111200.1

(51) Int. Cl.
*B05C 9/10* (2006.01)
*B05C 11/02* (2006.01)
(Continued)

(52) U.S. Cl.
CPC .............. *B05C 9/10* (2013.01); *B05C 1/0808* (2013.01); *B05C 1/0826* (2013.01);
(Continued)

(58) Field of Classification Search
USPC ..... 118/304, 211, 212, 302; 425/174.4, 385, 425/62; 101/35–44, 4–11
See application file for complete search history.

(56) References Cited

U.S. PATENT DOCUMENTS

| 5,490,646 A | 2/1996 | Shaw et al. |
| 5,979,001 A | 11/1999 | Marrero |

(Continued)

FOREIGN PATENT DOCUMENTS

| DE | 2 118 689 | 5/1973 |
| DE | 40 25 663 | 10/1991 |

(Continued)

OTHER PUBLICATIONS

German Search Report for DE Application No. 10 2019 111 200.1 dated Mar. 11, 2020, 8 pages.

*Primary Examiner* — Yewebdar T Tadesse
(74) *Attorney, Agent, or Firm* — Nixon & Vanderhye P.C.

(57) ABSTRACT

A device for lacquer transfer is disclosed including a frame, a transfer roller with a circumferential lateral wall, and a nozzle for dispensing lacquer, wherein the nozzle is connected to the frame, wherein an outside contact surface of the lateral wall comprises several depressions, wherein the transfer roller is mounted rotatably about an axis of rotation at the frame, wherein the nozzle is arranged contactless to or in direct contact with the outside contact surface of the lateral wall for dispensing lacquer into respective depressions in the lateral wall while the transfer roller is rotated about the axis of rotation, and wherein the transfer roller is configured to roll with the outside contact surface on a work surface of a work piece for transferring the lacquer from the depressions to the work surface of the work piece.

15 Claims, 3 Drawing Sheets

(51) Int. Cl.
  *B05C 1/08*   (2006.01)
  *B05C 13/02*  (2006.01)
  *B64F 5/40*   (2017.01)
  *B25J 11/00*  (2006.01)

(52) U.S. Cl.
  CPC ............ *B05C 11/025* (2013.01); *B05C 13/02* (2013.01); *B64F 5/40* (2017.01); *B25J 11/0075* (2013.01)

(56) References Cited

U.S. PATENT DOCUMENTS

| | | | |
|---|---|---|---|
| 8,424,482 B2* | 4/2013 | Joehren ................ | B05C 1/0817 |
| | | | 118/261 |
| 2014/0284012 A1* | 9/2014 | Gustavsson ........... | D21F 3/0281 |
| | | | 162/206 |
| 2016/0026082 A1 | 1/2016 | Chen et al. | |
| 2017/0095831 A1* | 4/2017 | Sturm ................... | B05D 3/067 |
| 2019/0263972 A1* | 8/2019 | Cohen ................... | C08K 5/005 |

FOREIGN PATENT DOCUMENTS

| | | |
|---|---|---|
| JP | 05-93289 | 4/1993 |
| JP | 2007-268391 | 10/2007 |
| WO | 2015/155128 | 10/2015 |

\* cited by examiner

DEVICE FOR LACQUER TRANSFER

CROSS REFERENCE TO RELATED APPLICATION

This application claims priority to and incorporates by reference German Application Number DE 10 2019 111 200.1, filed Apr. 30, 2019.

BACKGROUND

The present disclosure relates to a device for lacquer transfer to a work surface, in particular to an aerodynamic surface of an aircraft, such as an outer surface of a wing.

The device comprises a frame, a transfer roller with a circumferential lateral wall, and a nozzle preferably in the form of a slit nozzle with a muzzle end for dispensing lacquer. The nozzle is directly or indirectly connected to the frame. An outside contact surface of the lateral wall comprises several depressions. The transfer roller is mounted rotatably about an axis of rotation at the frame. The nozzle is arranged contactless to or in direct contact with the outside contact surface of the lateral wall for dispensing lacquer into respective depressions in the lateral wall while the transfer roller is rotated about the axis of rotation. The transfer roller is configured to roll with the outside contact surface on a work surface of a work piece for transferring the lacquer from the depressions to the work surface of the work piece.

A similar device for lacquer transfer is known from WO 2015/155 128 A1.

With known devices for lacquer transfer the quality of lacquer adhesion on the work surface might suffer from dust and dirt particles present on the work surface, as well as from an irregular roughness of the work surface.

SUMMARY

The present invention provides a device by which the quality of lacquer adhesion on the work surface can be increased.

This is achieved by a device comprising the features of claim 1. Specifically, the object is achieved in that the device comprises a surface preparation unit for preparing the work surface for lacquer transfer to improve lacquer adhesion. The surface preparation unit is arranged upstream from the transfer roller, i.e. at a position ahead of the transfer roller with respect to a direction of movement of the device during lacquer transfer, such that the work surface is prepared by the surface preparation unit before the work surface is contacted by the transfer roller, when the device is moved over the work surface for lacquer transfer. The surface preparation unit may be connected directly or indirectly to the frame. In such a way, the quality of lacquer adhesion on the work surface can be increased.

The device may comprise a hardening unit that might be connected directly or indirectly to the frame and that might be formed as a UV-light unit configured for hardening the lacquer in a contactless way by emitting UV-light. UV-light within the meaning of the present invention is any kind of UV-radiation. The hardening unit might be arranged within an interior space defined by or formed within the transfer roller. The lateral wall of the transfer roller might be transparent for UV-light. The hardening unit might be arranged such that UV-light is emitted towards the work surface upon which the lateral wall of the transfer roller rolls, to harden the lacquer preferably immediately after it being transferred to the work surface.

The device or at least its frame may be configured to be releasably connected to a handling device, such as a robot with a robot arm. The frame may be configured to be releasably connected to the robot arm. Thus, the device may be a mobile device, in particular a mobile mechanical device.

The frame may form the bases of the device, since the slit nozzle and the hardening unit are each at least indirectly connected to the frame. For this purpose, the device may comprise further connecting means for connecting the slit nozzle to the frame and/or further connecting means for connecting the hardening unit to the frame. Thus, the slit nozzle and the hardening unit may be mounted to the frame. The slit nozzle may be releasably connected to the frame. Thus, the slit nozzle may be disconnected form the frame, in particular for a maintenance purpose. The slit nozzle may be connected to the frame, such that the slit nozzle can be releasably locked in a working position. If this lock is released, the slit nozzle may be pivoted via a hinge, which holds the slit nozzle at the frame. Thus, the slit nozzle may then be subject to a maintenance procedure.

The transfer roller is mounted rotatably to the frame. The transfer roller can therefore rotate about the axis of rotation. For this purpose, the device may comprise a drive unit, which is configured to drive the transfer roller in a rotation direction of the transfer roller about the axis of rotation. The drive unit may also be at least indirectly connected or mounted to the frame. During use, the drive unit drives the transfer roller, such that the transfer roller rotates about the axis of rotation and roles with the contact surface on a work surface. Furthermore, the device is moved translational in parallel to the work surface, preferably by a robot arm or another handling device, while the transfer roller rotates, such that the transfer roller rolls on the work surface for transferring lacquer.

The slit nozzle may be connected via a pipe or a tube to a lacquer supply unit, which may be configured to supply the lacquer via the tube or the pipe to the slit nozzle. The lacquer can be hardened via UV-light. The lacquer supplied to the slit nozzle may be a liquid medium or a viscous medium.

According a first nozzle arrangement of the slit nozzle, the muzzle end of the slit nozzle may be arranged contactless to the outside contact surface of the lateral wall for dispensing lacquer into respective depressions.

According to an alternative second nozzle arrangement of the slit nozzle, the muzzle end of the slit nozzle is arranged in direct contact with the outside contact surface of the lateral wall for dispensing lacquer into respective depressions.

If reference is subsequently made to the slit nozzle without explicitly specifying the first or second nozzle arrangement, the corresponding explanations may, in principle, apply as preferred embodiments to each of the two arrangements. Therefore, it may be possible to apply the respective explanations to one of the first and second nozzle arrangement or to both nozzle arrangements.

The slit nozzle is configured for dispensing lacquer into the depressions of the lateral wall of the transfer roller. The slit nozzle may also be configured for dispensing lacquer onto depression-free sections of the lateral wall of the transfer roller. Thus, the slit nozzle may be configured for dispensing a lacquer film onto the lateral wall of the transfer roller, wherein the lacquer of the lacquer film fills the depressions and the lacquer film extends in axial direction and partly in circumferential direction of the transfer roller. The lacquer film may therefore theoretically divide into a depression part, which fills the depressions, and a remaining part, which is also referred to as bulk or a bulk part. Therefore, the transfer roller may be configured to roll with the contact surface of the transfer roller on a work surface of a work piece for transferring the lacquer from the contact surface to the work surface of the work piece, such that the lacquer film is transferred to the work surface. This encompassed the transfer of the lacquer from the depressions, but also the transfer of the bulk part. If the transfer of the lacquer from the depressions to the work surface, in particular to a surface of a wing, is described in the following, this shall preferable not exclude the possible transfer of the bulk part to the respective surface and/or the possible transfer of the lacquer from the depressions via the lacquer film.

Resulting from the direct contact between the muzzle end of the slit nozzle and the outside surface of the lateral wall of the transfer roller, preferably if the slit nozzle is in the second nozzle arrangement, a desired fill level of the depressions may be ensured and/or a desired mean thickness of the lacquer film may be ensured. However, a resulting contact force and/or a resulting contact friction should not change as much as possible during a rotation of the transfer roller in order to prevent a slip-stick-effect.

But a desired fill level of the depression may also be ensured and/or a desired mean thickness of the lacquer film on the outside surface of the lateral wall may be ensured, if the muzzle end of the slit nozzle is arranged contactless to the outside contact surface of the lateral wall, in particular, if the slit nozzle is arranged according to the first nozzle arrangement. A distance formed by the gap between the slit nozzle and the outside contact surface at the second deformation section may be predefined by an arrangement of the slit nozzle according to the second nozzle arrangement, such that lacquer dispensed by the slit nozzle continuously forms the lacquer film on the on the outside surface of the lateral wall, preferably with a predefined thickness. The dispensed lacquer therefore fills the aforementioned gap with the lacquer. As an effect, lacquer also fills the depressions of the outside contact surface at the second deformation section of the lateral wall. As a further effect, a bulk part may also be applied to the outside contact surface at the second deformation section of the lateral wall.

According to an exemplary embodiment, the surface preparation unit comprises a sanding unit for sanding the work surface for lacquer transfer to improve lacquer adhesion on the work surface. The sanding unit might be, for example, in the form of a belt sander or a roller sander.

According to another exemplary embodiment, the surface preparation unit comprises a cleaning unit for cleaning the work surface for lacquer transfer to improve lacquer adhesion on the work surface.

In particular, the cleaning unit may comprise an air blower blowing an air stream onto the work surface in a direction away from the transfer roller, preferably under an acute angle with respect to the work surface. The air stream might be aligned with the direction of movement of the device or might be skewed sidewards with respect to the direction of movement of the device during lacquer transfer, when viewed in a plane parallel to the work surface. Such an air blower enables simple and efficient cleaning of the work surface.

Alternatively or additionally, the cleaning unit may comprise an electrostatic cleaning device, wherein dust particles on the work surface are electrostatically affected, in particular electrostatically charged or neutralized, and subsequently removed by electric force and/or suction. Such an electrostatic cleaning device enables a simple and efficient cleaning of the work surface.

Alternatively or additionally, the cleaning unit may comprise a rotatable brush roller for brushing dust and/or dirt off the work surface ahead of the lacquer transfer. The brush roller may be rotatable in a direction opposite to the rotation of the transfer roller, so that dust and/or dirt on the work surface is brushed away from the transfer roller in the direction of movement of the device during lacquer transfer.

In particular, the brush roller may be arranged in a skewed manner, such that a brush roller axis of rotation extends under an acute angle with respect to the direction of movement of the device during lacquer transfer, so that dust and/or dirt is brushed away slightly sidewards. In such a way, it can be avoided that laterally deflected dust and/or dirt is thrown to preceding lanes that have already been cleaned.

The cleaning unit may comprise a brush roller suction device for suction cleaning the brush roller during brushing operation, i.e. during rotation of the brush roller. In particular, the brush roller suction device cleans the bristles of the brush roller from the dust and dirt brushed off the work surface, so that the clean bristles can absorb new dust and/or dirt with the subsequent turn of the brush roller. The brush roller suction device may be connected directly or indirectly to the frame.

The brush roller suction device may comprise a suction head, preferably in the form of a suction hood, arranged above the brush roller, i.e. on the side of the brush roller opposite the work surface, and preferably extending along the brush roller axis of rotation. Such a suction head enables efficient cleaning of the brush roller.

According to an exemplary embodiment, the cleaning unit comprises a guard arranged downstream from the brush roller to catch dust and/or dirt thrown from the brush roller in the direction of the transfer roller, to protect the transfer roller and the work surface downstream from the brush roller from the dust and dirt.

In particular, the guard may be formed as a flexible lip extending from, or mounted to, a downstream end of the suction head to the work surface, wherein the work surface is either contacted by the lip or a gap is left between the lip and the work surface. The lip may extend in an angled manner with respect to a direction perpendicular to the work surface, wherein the lip extends either angled to the front such that its lower end extends partly below the brush roller, or the lip extends angled to the rear such that it is dragged behind the brush roller. Such a flexible lip provides a reliable dust protection and adapts to irregularities in the work surface.

According to another exemplary embodiment, the cleaning unit comprises a surface suction device arranged opposite the work surface downstream from the brush roller and preferably downstream from the guard, for suction cleaning of the work surface downstream from the brush roller from residual dust and/or dirt that has not been brushed off by the brush roller. The surface suction device may be connected directly or indirectly to the frame.

In particular, the surface suction device comprises a plurality of elongate suction nozzles extending in a direction parallel to the brush roller axis of rotation in a staggered manner with their ends overlapping, to cover the entire extension of the brush roller along the brush roller axis of rotation, so that no dust and/or dirt is missed.

According to an exemplary embodiment, the transfer roller, may include the nozzle and/or the deformation unit, is arranged in a protective housing to be protected from dust and/or dirt thrown from the brush roller in the direction of the transfer roller. In such a way, the transfer roller is isolated from the cleaning unit, so that no dust and/or dirt from the cleaning unit can reach through to the transfer roller and affect the lacquer transfer.

According to another exemplary embodiment, the cleaning unit comprises a cleaning liquid dispenser for applying cleaning liquid onto the work surface to bond or dissolve dust and/or dirt on the work surface. The cleaning liquid dispenser may apply the cleaning liquid onto the work piece by ejecting the cleaning liquid through one or more nozzles. The cleaning unit may further comprise downstream from the cleaning liquid dispenser a device for tacking up the cleaning liquid and cleaning the work surface in a wiping process. Additionally or alternatively, to accelerate drying of the work surface from the cleaning liquid, a drying unit including e.g. a heater and/or a blower might be provided downstream from the cleaning liquid dispenser.

BRIEF DESCRIPTION OF THE DRAWINGS

Further features, advantages and application possibilities of the present invention may be derived from the following description of exemplary embodiments and/or the figures. Thereby, all described and/or visually depicted features for themselves and/or in any combination may form an advantageous subject matter and/or features of the present invention independent of their combination in the individual claims or their dependencies. Furthermore, in the figures, same reference signs may indicate same or similar objects.

In the accompanying drawings, like reference characters refer to the same or similar parts throughout the different views. The drawings are not necessarily to scale, emphasis instead being placed upon illustrating particular principles, discussed below.

DETAILED DESCRIPTION OF SOME EMBODIMENTS

Some embodiments will now be described with reference to the Figures.

Figure 1:
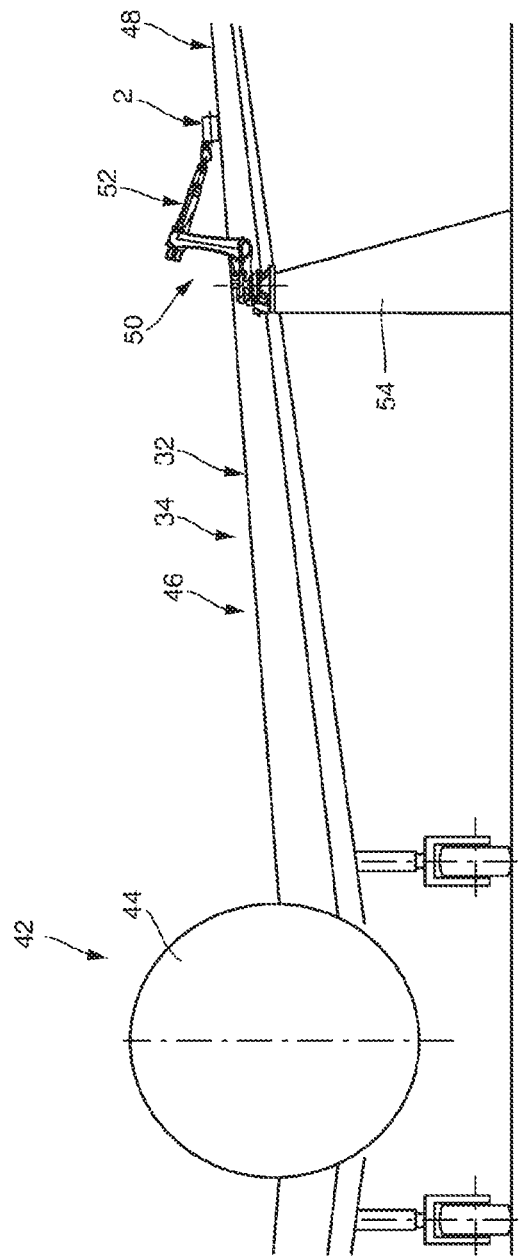
FIG. 1 schematically illustrates a part of an aircraft wherein a device arranged for transferring lacquer on an upper wing surface.

FIG. 1 schematically illustrates an aircraft 42, which comprises a fuselage 44 and a wing 46. The air resistance of the aircraft 42 can be reduced, if the upper wing surface 48 of the wing 46 comprises a profile structure. It has been found of advantage, if this profile structure is a microstructure.

FIG. 1 also schematically shows a robot 50, which is seated on a rack 54. The robot 50 comprises a movable robot arm 52. A device 2 is mounted at an end of the robot arm 52, such that the device 2 can be moved by the robot 50.

The device 2 is configured for transferring a lacquer onto a work surface 32 of a workpiece 34. According to the example shown in FIG. 1, the workpiece 34 can be formed by the wing 46 of the aircraft 42. Thus, the upper wing surface 48 can form the work surface 32.

Figure 2:
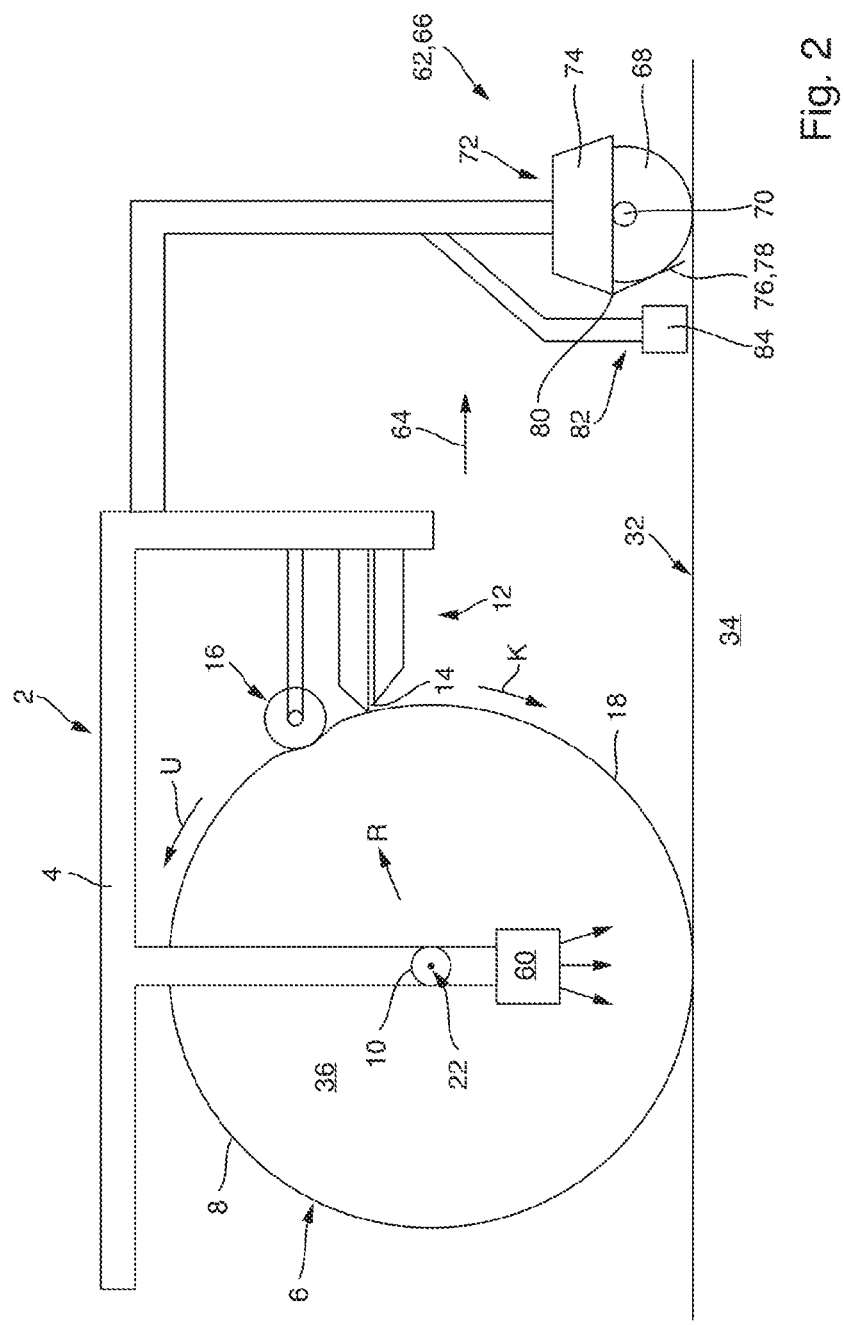
FIG. 2 schematically illustrates an embodiment of the device in a cross-sectional view.

A first embodiment of the device 2 is schematically illustrated in FIG. 2 in a cross-sectional view. The device 2 comprises a frame 4, a transfer roller 6 with a circumferential lateral wall 8, a drive unit 10, a slit nozzle 12 with a muzzle end 14 for dispensing lacquer, and a deformation unit 16. The transfer roller 6 may also be referred to as a transfer tire. The device 2 can be attached via the frame 4 to the robot arm 52. However, instead of a robot 50 any other handling device may also be used, which is configured to move the device 2 in space. The frame 4 may be adapted to be releasably connected to a handling device, such as the robot 50.

The transfer roller 6 is mounted rotatably, in particular by means of at least one bearing, about an axis of rotation 22 at the frame 4. An outside contact surface 8 of the lateral wall 6 comprises several depressions 20. The depressions 20 may be evenly or stochastically distributed about the circumference of the lateral wall 6. The FIGS. 3 and 4 show a part of the transfer roller 6 in a cross-section view and a top view, respectively.

Figure 3:
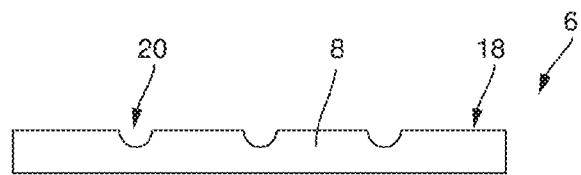
FIG. 3 schematically illustrates a part of the lateral wall of the transfer roller in a cross-sectional view.

As schematically indicated in FIG. 3, the depressions 20 can be formed by recesses arranged at the outside surface 18 of the lateral wall 8 of the transfer roller 6. The depressions 20 can have a predefined size and/or structure. A mean structure size of the depressions 20 can be in the range of 0.1 micrometer to 100 micrometer. In other words, each of the depressions 20 may have a microstructure.

Figure 4:
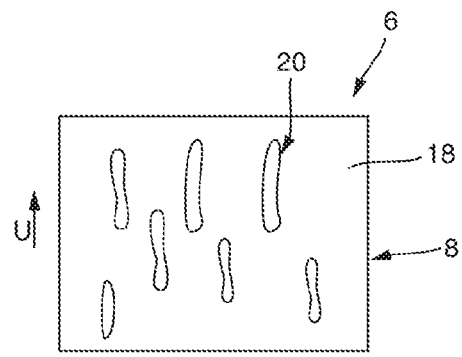
FIG. 4 schematically illustrates a further embodiment of the lateral wall of the transfer roller in a top view.

FIG. 4 exemplarily shows the depressions 20 of a part of the lateral wall 8 of the transfer roller 6 in a top view. Each of the depressions 20 may comprise an elongated extension in a circumferential direction U of the lateral wall 8 of the transfer roller 6.

Each of the depressions 20 is configured to receive lacquer and to transfer this received lacquer to a work surface 32 of a work piece 34, such as the upper wing surface 48 of a wing 26. Therefore, the several depressions 20 at the outside contact surface 18 of the lateral wall 8 may be arranged and/or formed according to a predefined structure, in particular a microstructure. The lateral wall 8 is preferably made of silicone, such that a damage of the wing surface 48 can be prevented.

If the depressions 20 are filled with a lacquer and if the outside contact surface 18 comes into contact with the work surface 32, in particular the upper wing surface 48, the lacquer previously received in the depressions 20 is transferred to the work surface 32, in particular the upper outside surface 48 of the aircraft 42. This transferred lacquer has a structure, in particular microstructure, corresponding to a structure defined by depressions 20. Thus, the outside contact surface 18 with its depressions 20 is configured for embossing a lacquer-structure, in particular a lacquer-microstructure, on the work surface 32, in particular the upper wing surface 48.

As schematically illustrated in FIG. 2, the slit nozzle 12 is directly or indirectly connected to the frame 4. Thus, the slit nozzle 12 may be mounted to the frame 4. Furthermore, the deformation unit 16 is directly or indirectly connected to the frame 4. For instance, the deformation unit 16 may be mounted on the frame 4. According to an example not illustrated in FIG. 2, the slit nozzle 12 and the deformation unit 16 may be formed by an integrated unit. But the slit nozzle 12 may also be directly connected to the deformation unit 16, or vice versa. Thus, the slit nozzle 12 and the deformation unit 16 may be mounted in series to the frame 4.

The device 2 also comprises the drive unit 10. The drive unit 10 is configured to drive the transfer roller 6 in a rotation direction K about the axis of rotation 22.

The lateral wall 8 of the transfer roller 6 is elastically deformable in a radial direction R of the transfer roller 6. The lateral wall 8 of the transfer roller 6 can be made of an elastomer plastic, a silicone or any other elastically deformable plastic material. The lateral wall 8 of the transfer roller 6 may be made of a synthetic, elastically deformable silicone. As a result, the lateral wall 8 can be at least sectionwise deformed in positive or negative radial direction R. The deformation unit 16 is configured to deform the lateral wall 8 in the radial direction R of the transfer roller 6 upstream from the slit nozzle 12 to provide a stable distance of the lateral wall 8 to the muzzle end 14 of the slit nozzle 12 for a defined application of lacquer to the outside contact surface 18 of the lateral wall 8. If references made to the radial direction R, this may refer to the positive radial direction R or an opposite negative radial direction.

The device 2 further comprises a hardening unit 60. The hardening unit 60 is configured for hardening the lacquer in a contactless way. The hardening unit 60 is formed by an UV-light unit. The hardening unit 60 is directly or indirectly connected to the frame 4. Moreover, the hardening unit 60 is arranged within the interior space 36 formed by the transfer roller 6. The lateral wall 8 of the transfer roller 6 is configured to transmit UV-light-waves. Thus, the lateral wall 8 is transparent for UV-light. The hardening unit 60 is arranged, such that UV-light is emitted towards the work surface 32 upon which the lateral wall 8 of the transfer roller 6 rolls. The lacquer is hardenable via UV-light. Therefore, the device is configured to control the drive unit 10 and/or the hardening unit 60 such that lacquer transferred to the work surface 32 is immediately hardened via UV-light emitted by the hardening unit 60.

As shown in FIG. 2, the device 2 comprises a surface preparation unit 62 for preparing the work surface 32 for lacquer transfer to improve lacquer adhesion. The surface preparation unit 62 is connected to the frame 4 and is arranged upstream from the transfer roller 6, i.e. at a position ahead of the transfer roller 6 with respect to a direction of movement 64 of the device 2 during lacquer transfer. The surface preparation unit 62 comprises a cleaning unit 66 for cleaning the work surface 32 to improve lacquer adhesion on the work surface 32.

The cleaning unit 66 comprises a rotatable brush roller 68 for brushing dust and/or dirt off the work surface 32 ahead of the lacquer transfer by the transfer roller 6. The brush roller 68 is rotatable in a direction opposite to the rotation of the transfer roller 6, so that dust and/or dirt on the work surface 32 is brushed away from the transfer roller 6 in the direction of movement 64 of the device 2 during lacquer transfer. The brush roller 68 is arranged in a skewed manner, such that a brush roller axis of rotation 70 extends under an acute angle with respect to the direction of movement 64 of the device 2 during lacquer transfer, so that dust and/or dirt is brushed away slightly sidewards.

The cleaning unit 66 further comprises a brush roller suction device 72 for suction cleaning the brush roller 68 during brushing operation, i.e. during rotation of the brush roller 68. The brush roller suction device 72 is connected to the frame 4 and comprises a suction head 74 in the form of a suction hood arranged above the brush roller 68 and extends along the brush roller axis of rotation 70.

Further, the cleaning unit 66 comprises a guard 76 arranged downstream from the brush roller 68 to catch dust and/or dirt thrown from the brush roller 68 in the direction of the transfer roller 6, to protect the transfer roller 6 and the work surface 32 downstream from the brush roller 68 from the dust and dirt. The guard 76 is formed as a flexible lip 78 mounted to a downstream end 80 of the suction head 74 and extending downwards to the work surface 32. The lip 78 extends in a sloped manner with respect to a direction perpendicular to the work surface 32, specifically sloped to the front such that its lower end extends partly below the brush roller 68.

The cleaning unit 66 also comprises a surface suction device 82 arranged opposite the work surface 32 downstream from the brush roller 68 and from the guard 76, for suction cleaning of the work surface 32 downstream from the brush roller 68 from residual dust and/or dirt. The surface suction device 82 is connected to the frame 4 and comprises a plurality of elongate suction nozzles 84 extending in a direction parallel to the brush roller axis of rotation 70 in a staggered manner with their ends overlapping, to cover the entire extension of the brush roller 68 along the brush roller axis of rotation 70.

It is additionally pointed out that "comprising" does not rule out other elements, and "a" or "an" does not rule out a multiplicity. It is also pointed out that features that have been described with reference to one of the above exemplary embodiments may also be disclosed as in combination with other features of other exemplary embodiments described above. Reference signs in the claims are not to be regarded as restrictive.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A device for lacquer transfer, comprising:
   a frame,
   a transfer roller with a circumferential lateral wall, and
   a nozzle for dispensing lacquer,
   wherein the nozzle is connected to the frame,
   wherein an outside contact surface of a, lateral wall comprises several depressions,
   wherein the transfer roller is mounted rotatably about an axis of rotation at the frame,
   wherein the nozzle is arranged contactless to or in direct contact with the outside contact surface of the lateral wall for dispensing lacquer into respective depressions in the lateral wall while the transfer roller is rotated about the axis of rotation, and
   wherein the transfer roller is configured to roll with the outside contact surface on a work surface of a work piece for transferring the lacquer from the depressions to the work surface of the work piece,
   wherein the device comprises a surface preparation unit upstream from the transfer roller,
   wherein the surface preparation unit comprises a cleaning unit, and
   wherein the cleaning unit comprises a cleaning liquid dispenser for applying cleaning liquid onto the work surface.

2. The device according to claim 1, wherein the surface preparation unit comprises a sanding unit.

3. The device according to claim 1, wherein the surface preparation unit comprises a cleaning unit.

4. The device according to claim 3, wherein the cleaning unit comprises an air blower blowing an air stream onto the work surface in a direction away from the transfer roller.

5. The device according to claim 3, wherein the cleaning unit comprises an electrostatic cleaning device, wherein dust and/or dirt particles on the work surface are electrostatically affected and subsequently removed.

6. The device according to claim 3, wherein the cleaning unit comprises a rotatable brush roller.

7. The device according to claim 6, wherein the brush roller is arranged in a skewed manner, such that a brush roller axis of rotation extends under an acute angle with respect to the direction of movement of the device during lacquer transfer.

8. The device according to claim 6, wherein the cleaning unit comprises a brush roller suction device for suction cleaning the brush roller during brushing operation.

9. The device according to claim 8, wherein the brush roller suction device comprises a suction head arranged above the brush roller and extending along the brush roller axis of rotation.

10. The device according to claim 6, wherein the cleaning unit comprises a guard arranged downstream from the brush roller to catch dust and/or dirt thrown from the brush roller in the direction of the transfer roller.

11. The device according to claim 10, wherein the guard is formed as a flexible lip extending from a downstream end of the suction head to the work surface.

12. The device according to claim 6, wherein the cleaning unit comprises a surface suction device arranged opposite the work surface downstream from the brush roller for suction cleaning of the work surface downstream from the brush roller.

13. The device according to claim 12, wherein the surface suction device comprises a plurality of elongate suction nozzles extending in a direction parallel to the brush roller axis of rotation in a staggered manner.

14. The device according to claim 6, wherein the transfer roller is arranged in a protective housing to be protected from dust and/or dirt thrown from the brush roller in the direction of the transfer roller.

15. A device for lacquer transfer, comprising:
a frame,
a transfer roller with a circumferential lateral wall, and
a nozzle for dispensing lacquer,
wherein the nozzle is connected to the frame,
wherein an outside contact surface of a, lateral wall comprises several depressions,
wherein the transfer roller is mounted rotatably about an axis of rotation at the frame,
wherein the nozzle is arranged contactless to or in direct contact with the outside contact surface of the lateral wall for dispensing lacquer into respective depressions in the lateral wall while the transfer roller is rotated about the axis of rotation, and
wherein the transfer roller is configured to roll with the outside contact surface on a work surface of a work piece for transferring the lacquer from the depressions to the work surface of the work piece,
wherein the device comprises a cleaning liquid dispenser for applying cleaning liquid onto the work surface.

* * * * *